(12) United States Patent
Klinger et al.

(10) Patent No.: US 8,527,452 B2
(45) Date of Patent: Sep. 3, 2013

(54) CONSTRUCTION OF RULES FOR USE IN A COMPLEX EVENT PROCESSING SYSTEM

(75) Inventors: Doina L. Klinger, Winchester (GB); James S. Taylor, Winchester (GB)

(73) Assignee: International Business Machines Corporation, Armonk, NY (US)

(*) Notice: Subject to any disclaimer, the term of this patent is extended or adjusted under 35 U.S.C. 154(b) by 344 days.

(21) Appl. No.: 12/961,897

(22) Filed: Dec. 7, 2010

(65) Prior Publication Data

US 2011/0202496 A1  Aug. 18, 2011

(30) Foreign Application Priority Data

Feb. 18, 2010 (EP) .................................... 10153988

(51) Int. Cl.
*G06F 17/00* (2006.01)
*G06N 5/04* (2006.01)
(52) U.S. Cl.
CPC ........................................ *G06N 5/04* (2013.01)
USPC ............................................................ 706/60
(58) Field of Classification Search
None
See application file for complete search history.

(56) References Cited

U.S. PATENT DOCUMENTS

| 6,931,644 | B2 | 8/2005 | Riosa et al. |
| 7,421,704 | B2 | 9/2008 | Young |
| 7,562,339 | B2 | 7/2009 | Racca et al. |
| 7,962,490 | B1 * | 6/2011 | Kariv ............................ 707/749 |
| 8,352,402 | B2 * | 1/2013 | Tirelli et al. ..................... 708/47 |
| 2006/0143439 | A1 * | 6/2006 | Arumugam et al. .......... 713/153 |
| 2007/0150330 | A1 | 6/2007 | McGoveran |

OTHER PUBLICATIONS

"Seamlessly Updating a Business Process in a Workflow Engine," IBM Technical Disclosure, Nov. 3, 2005.
"Method for Discovering Data to be Associated to Business Events," IBM Technical Disclosure, Aug. 1, 2007.

* cited by examiner

*Primary Examiner* — Alan Chen
(74) *Attorney, Agent, or Firm* — Winstead, P.C.

(57) ABSTRACT

A system and computer program product for specifying complex event processing (CEP) system rules. A rule construction interface is provided for constructing rules for a rule set of the complex event processing system, where the rules include definitions of one or more detected events and corresponding actions. In response to an identification of a new event or action during the rule construction process via the rule construction interface, a corresponding event or action logical construct is generated for representing the event or action in the complex event processing system. An intermediate logical construct is generated to provide a data connection for the event or action logical construct. The event or action logical construct is linked to a corresponding action or event logical construct via the intermediate logical construct so as to enable data flow between the objects.

16 Claims, 9 Drawing Sheets

| 314 | TOUCHPOINT | TPID2 | 316 |

| 315 | ACTION | ACTIONID1 | 317 |
| | TOUCHPOINT | =>TPID2 | 318 |
| | FIELD1 | VALUE2 | 319 |

FIG. 3C

| 320 | FILTER | FID1 | 321 |
| 322 | EXPRESSION1 | ELEMENT1 | 324 |
| | | ELEMENT2 | 324 |
| | | ELEMENT3 | 324 |
| | OPERATOR | OPID | 323 |
| 322 | EXPRESSION2 | ELEMENT4 | |
| | | ELEMENT5 | |

| RULE | SHORT SELLING CHECK |
|---|---|
| EVENT: SELL | |
| ACTION: NCS | |
| FILTER: SHORT SELLING | |
| RELATION: CUSTOMERID | |

402:

| EVENT | BUY |
|---|---|
| TOUCHPOINT | SALES |
| FIELD1 | VALUE |

407:

| TOUCHPOINT | CSS |
|---|---|

403:

| ACTION | NOTIFY CUSTOMER SERVICES |
|---|---|
| TOUCHPOINT | CSS |
| FIELD1 | VALUE3 |

404:

| FILTER | SHORT SELLING |
|---|---|
| EXPRESSION1 | EVENT: SELL |
|  | PRECEDES |
|  | EVENT: BUY |
|  | WITHIN 1 DAY |
| OPERATOR1 | AND |
| EXPRESSION2 | QUANTITY |
|  | > |
|  | 1000 |

406:

| TOUCHPOINT | SALES |
|---|---|

405:

| EVENT | SELL |
|---|---|
| TOUCHPOINT | SALES |
| FIELD1 | VALUE1 |

408:

| INTERMEDIATE OBJECT | IOID1 |
|---|---|
| FIELD1 | =>VLUE1 |
| FIELD2 | CUSTOMERID |
| FIELD3 | QUANTITY |

CONSTRUCTION OF RULES FOR USE IN A COMPLEX EVENT PROCESSING SYSTEM

CROSS-REFERENCE TO RELATED APPLICATIONS

This application claims priority under 35 U.S.C. §119(a) from European Patent Application No. 10153988.0, filed on Feb. 18, 2010, the contents of which are incorporated herein by reference.

TECHNICAL FIELD

The present invention relates to a method, apparatus or software for construction of rules for use in a complex event processing system.

BACKGROUND

Complex event processing (CEP) application programs are arranged to perform event driven processes. In other words, CEP application programs are arranged to detect a predetermined set of events and to perform a set of one or more actions in response to such detection. Generally, CEP application programs are used to analyze complex patterns of events and perform a predetermined set of actions in response. The sets of events detected and the associated actions are commonly defined in a set of rules, which may be referred to as CEP rules. CEP application programs have many applications, such as monitoring of biological, manufacturing, medical, aerospace, automotive or business systems. When CEP application programs are applied to business systems, they may be referred to as business event processing (BEP) application programs.

CEP application programs commonly provide an interface arranged to enable the creation or input of CEP rules by a user. Such CEP interfaces enable sets of events to be selected and one or more actions to be defined as responses to those events. In addition, filters may be associated with given events or actions that enable event data to be filtered in accordance with the specified conditions or for the performance of a given action to be conditional on one or more defined data inputs. Such CEP interfaces commonly also enable the user to select the touch points for a given CEP rule, that is, identifications of the source of each event and the target for each action.

Some CEP rule creation interfaces are arranged as strongly typed systems and therefore, all of the artefacts or elements of event logic, such as events, actions, filters or touch points, that are presented for selection for a given rule via the CEP rule creation interface are predetermined. In other words, before a given artefact can be selected by a user, it is fully defined. Commonly, the primary user of a CEP rule creation interface is a high-level user, such as a business analyst, in the case of a BEP application program. Such a high-level user is generally capable of generating the event processing logic for a given rule by selecting the events, actions and filters from a predetermined set of such artefacts. In other words, the high-level user can choose logical elements that have already been implemented in the system by a more technical user versed in the associated information technology (IT) systems.

Once the high-level user has selected the appropriate artefacts for a given rule, a further input from the more technical user is commonly required to correct problems with the data definition and the specification of data flow to be performed that were identified in the process of writing of the rules. The completed rule can then be provided to the high-level user for testing. The technical user may be required to review the data definitions or data flow or for the creation of additional events, actions or touch points.

BRIEF SUMMARY

In one embodiment of the present invention, a computer program product embodied in a computer readable storage medium for construction of rules for use in a complex event processing application program comprises the programming instructions for providing a rule construction interface for constructing rules for a rule set of a complex event processing system, the rules comprising definitions of one or more detected events and corresponding actions, the interface being arranged to enable a user definition of new events or actions during a rule construction process. The computer program product further comprises the programming instructions for, in response to an identification of a new event or action during the rule construction process via the rule construction interface, generating a corresponding logical event or action construct for representing the event or action in the complex event processing system. Additionally, the computer program product comprises the programming instructions for generating an intermediate logical construct arranged to provide a data connection for the logical event or action construct. In addition, the computer program product comprises the programming instructions for linking the logical event or action construct to a corresponding logical action or event construct via the intermediate logical construct.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

Embodiments of the present invention will now be described by way of example with reference to the accompanying drawings in which:

FIGS. 3A-3D are schematic illustrations of logical constructs that may be created during the construction of CEP rules by the CEP rule construction application program of FIG. 1 in accordance with an embodiment of the present invention;

FIG. 4 is an example of the set of logical constructs created by the CEP rule construction application program in response to an input of an example rule via the interface of FIG. 2 in accordance with an embodiment of the present invention;

DETAILED DESCRIPTION

Figure 1:
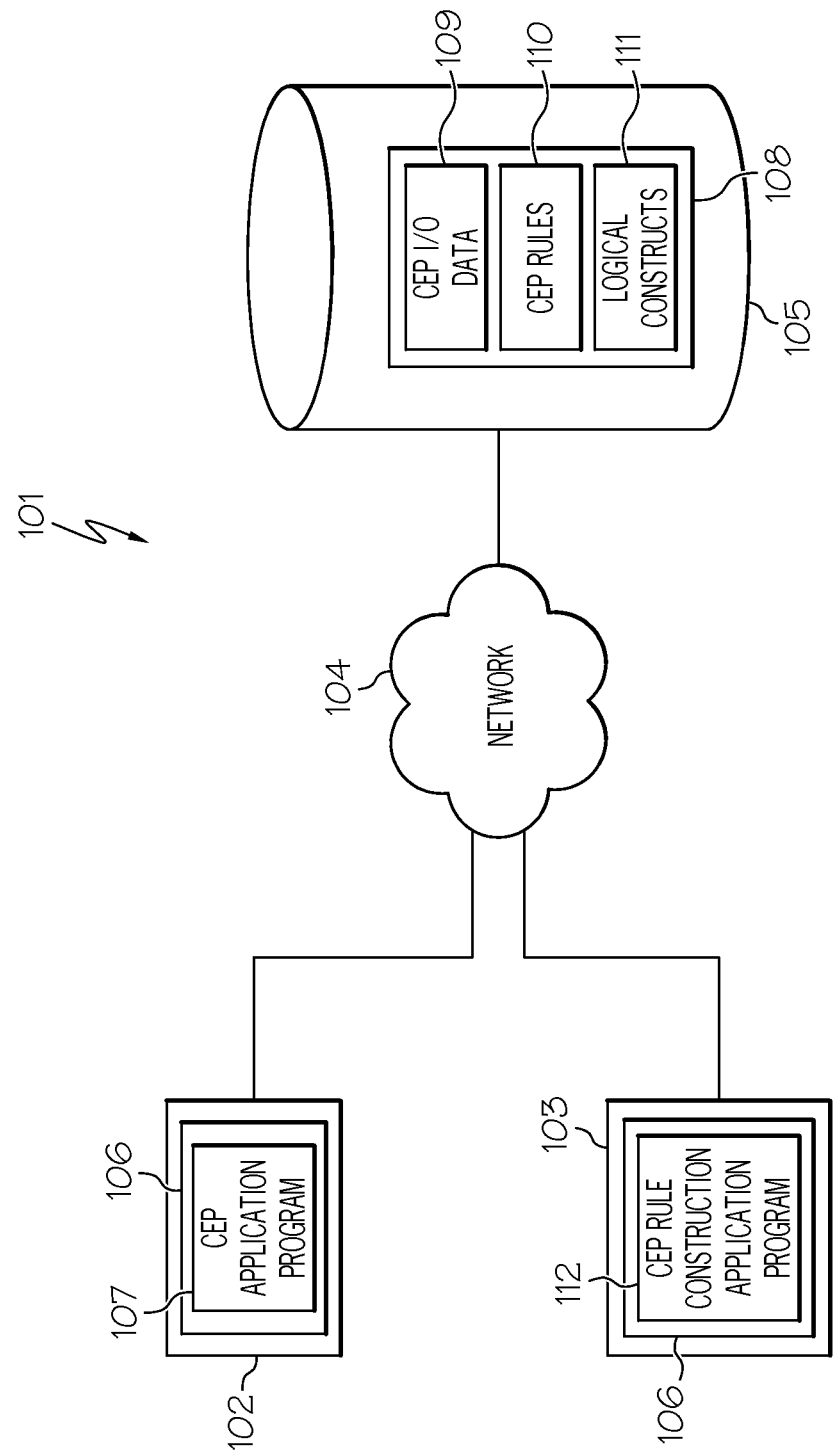
FIG. 1 is a schematic illustration of a complex event processing (CEP) system comprising a CEP rule construction application program in accordance with an embodiment of the present invention.

With reference to FIG. 1, a computer system 101 comprises a first and second computers 102, 103 connected via a network 104 to a storage device 105. The first and second computers are each provided with an operating system 106 that provides a platform for one or more application programs. In the present embodiment, the first computer 102 is arranged to run a complex event processing (CEP) application program 107. The storage device 105 comprises a database 108 arranged to hold CEP input and output data 109, in the form of events and action data or messages, CEP rules 110 and CEP rule constituents, referred to herein, as CEP logical constructs 111, that is, data structures arranged to represent events, actions, filters and touch points within the CEP application program 107. The CEP application program 107 is arranged to respond to received sets of one or more events 109 with appropriate actions 109, in accordance with the relevant rules 110.

The second computer 103 is arranged to run a CEP rule construction application program 112 arranged to enable the construction of CEP rules 110 from CEP logical constructs 111 representing the events, actions, filters, relations and touch points in the CEP system. An event is the input data or message that may trigger one or more CEP rules 110. Any given rule may be triggered by a group of two or more such events. Actions are the output data or message of a given CEP rule as a result of its trigger. A given rule, when fired, may result in one or more actions being output. Touch points are related to events or actions and for an event define the source of the event and for an action define the target or destination for the event. Filters are used to specify conditions on a given event pattern detected or on the actions that may be generated as a result. Relations used define a required relationship between the events that are being detected. In other words, the relation defines a rule-wide condition or filter for the relevant set of events.

Figure 2:
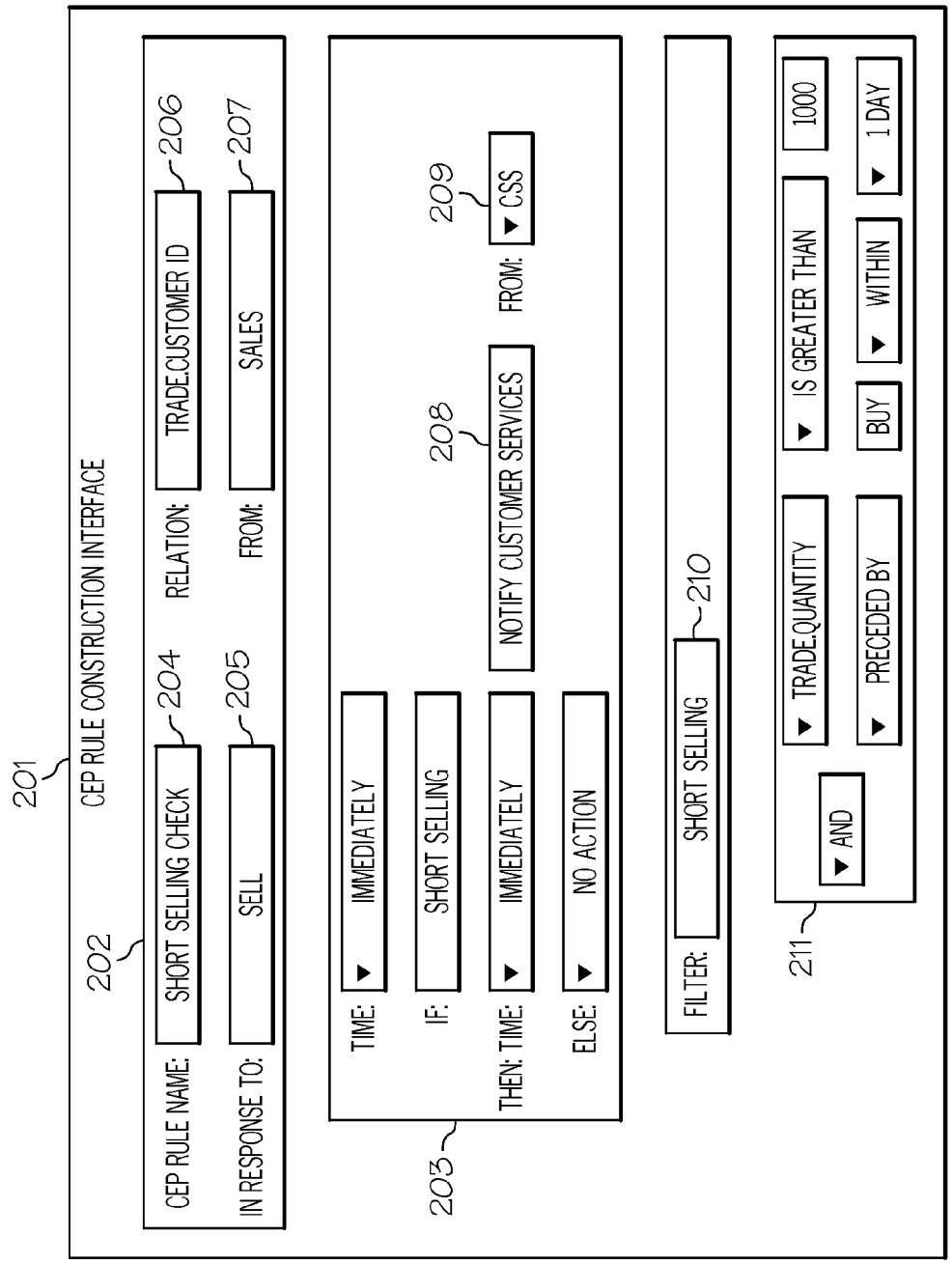
FIG. 2 is a schematic illustration of the user interface for the CEP rule construction application program of FIG. 1 in accordance with an embodiment of the present invention.

As shown in FIG. 2, in conjunction with FIG. 1, the interface 201 is arranged, in a known manner, to enforce the syntax of the CEP rules 110, that is, the interface 201 only allows syntactically well-formed or correct CEP rules 110 to be constructed. In other words, the interface 201 dynamically presents for selection only the fields that comprise a syntactically correct CEP rule 110 based on the currently selected set of CEP logical constructs 111.

In the present embodiment, the form of a syntactically correct CEP rule 110 is stated generally as follows:

In response to Event U from Touch Point V and subject to Filter W then perform Action X on Touch Point Y In one embodiment, syntactically correct filter or conditions can take any suitable combination of events, timing criteria, logical operators or constants. For example, a filter may evaluate as true or false in dependence on whether or not a specified set of events have occurred in a particular sequence, within a predetermined relative time frame or within a specified period. As will be understood by those skilled in the art, each CEP logical element 111 may comprise a single such element or a sequence of two or more such elements and logical operators, such as logical OR, AND or NO, so as to form a composite logical element.

With further reference to FIG. 2, in conjunction with FIG. 1, the CEP rule construction application program 112 comprises an interface 201 providing a combination of user definable fields 202 (e.g., CEP rule name field 204, relation field 206, field 205 labeled "In response to:" and field 206 labeled "From:") and selectable predetermined options 203. The user definable fields enable a user to input new rules, events, actions, filters, relations, and touch points and to define data fields. The selectable predetermined options enable the user to select suitable logical or process operators, constants and timing options. FIG. 2 shows the interface 201 in use constructing a CEP rule 110 so as to embody the following rule requirement in a stock trading system:

"In response to the sale of shares by a user check for short selling and if present notify customer services. Short selling is the sale by a customer of over 1000 shares within a day of purchase by the same customer."

The above rule requirement may be represented as the following rule elements:
Events: Buy, Sell;
Relation: Customer ID;
Filter Name: Short Selling;
Filter Conditions: Trade.Quantity>1000 AND Sell precedes Buy within 1 Day; and
Action: Notify Customer Services.

The above elements from the natural language rules above are illustrated in FIG. 2, input onto the interface 201. In one embodiment, in response to such input by a user of new rule elements, the interface 201 is arranged to automatically create new CEP logical constructs 111 for representing the above rule elements within the CEP system. In other words, the CEP rule construction application program 112 enables the automatic creation of the CEP logical constructs 111 in-place, that is, during the creation of a given CEP rule 110.

New CEP logical constructs 111 are created from instantiations of corresponding logical construct templates. These templates are then, where possible, linked to existing logical constructs for the same CEP rule 110 in accordance with the correct syntax. As will be understood by those skilled in the art, such linking is performed by instantiating variables of the corresponding CEP logical constructs 111. When such a logical construct template is initially created, each variable is preset to a default value. When such variables have, where possible, been instantiated, the newly created CEP logical construct is added to the database 108. Some input to the interface 201 may result in updating of one or more existing CEP logical constructs 111 or in the creation of new CEP logical constructs 111 as described in further detail below.

Figure 3A:

With reference to FIGS. 2 and 3A, in response to the input of a new CEP rule name by a user via the rule field 204 of the interface 201, a new rule logical construct template 301 is created for representing the new rule. The rule logical construct template 301 comprises a first field that identifies that the construct represents a rule and is identified by a unique rule identifier (RuleID) 302. The rule logical construct template 301 comprises a further field 303 that identifies each other logical construct that forms part of the rule. In one embodiment, the field 303 defines the trigger event for the rule and its associated actions, any filters applied to the rules and any relationship specified as will be described in further detail below. The newly created rule logical object 301 is then stored in the database 108.

Figure 3B:
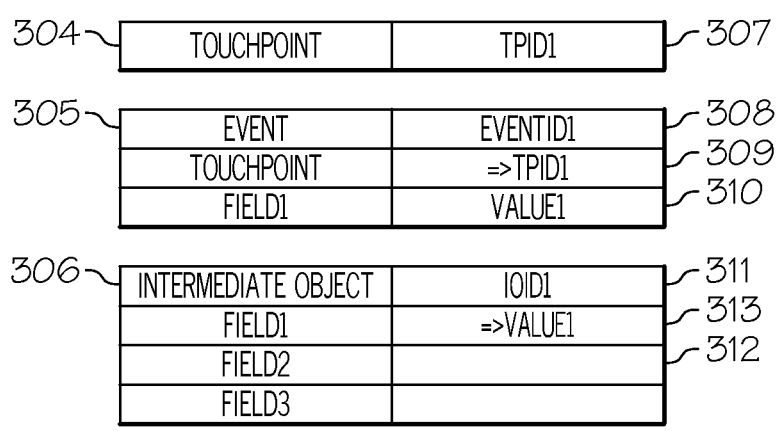

With reference to FIGS. 2 and 3B, in response to the input of a new CEP event name by a user via a primary event field 205 of the interface 201, a set of new logical construct templates are created for representing the new primary or trigger event for the given rule. The set comprises a touch point logical construct template 304, an event logical construct template 305 and an intermediate object construct template 306. The touch point logical construct template 304 is identified as such by a unique touch point identifier (TPID) 307 that uniquely identifies the source of the relevant event data. The event logical construct template 305 is identified as such by a unique event identifier (EventID) 308 and comprises a first touch point field 309 that identifies the associated touch point logical construct 304 and it is thus instantiated with the relevant touch point identifier. A data field 310 is provided to hold a default data field (Value) associated with the event. The intermediate object construct template 306, which is arranged to provide data connections between event, filter and action logical constructs, is identified by a unique intermediate object identifier (IOID) 311. The intermediate object construct template 306 further comprises a set of data fields 312 that are instantiated as required. In the present example, the first data field 313 is instantiated with a reference (=>Value) to the data field 310 of the event logical construct 305. Once the new event logical construct 305 has been created, the corresponding rule logical construct template 301 (FIG. 3A) is updated with the event identifier 308 so as to identify the new event logical construct 305 as the trigger event for the new rule 301. The touch point logical construct 304, event logical construct 305 and intermediate object construct 306 are then stored in the database 108 (FIG. 1).

With reference to FIGS. 2 and 3A, in response to the input of a new CEP relation by a user via a relation field 206 of the interface 201, the field 303 of the rule logical construct 301 is updated to identify the relation. In addition, with reference to FIG. 3B, the next free field 312 of the intermediate object logical construct 306 is instantiated with the relation.

With reference to FIGS. 2 and 3C, in response to the input of a new CEP action name by a user via an action field 208 of the interface 201, a set of new logical construct templates are created for representing the new action. The set comprises a touch point logical construct template 314 and an action logical construct template 315. The touch point logical construct template 314 may be updated by the user via the from field 209 of the interface 201. The action logical construct template 315 is identified as such by a unique action identifier (ActionID) 317 and comprises a first touch point field 318 arranged for identifying the associated touch point logical construct 314 and it is thus instantiated with the relevant touch point identifier 316. A second data field 319 is provided to hold a default data field (Value) associated with the action. As defined by the syntax of the CEP rules 110 (FIG. 1), each action is associated with one or more events and thus each action logical construct is associated with one or more event logical constructs.

Referring to FIGS. 1 and 3A-3C, as will be understood by those skilled in the art, some events input data into a given CEP rule 110 which may be passed to an action for output or other processing. In other words, the data is passed between the relevant events and their associated actions. In one embodiment, a data connection for passing such data is provided by the intermediate object logical construct 306 created in response to the definition of a new event logical construct 305 as described above. Thus, the second data field 319 may at some point be instantiated with a pointer or other suitable reference (=>Value) from the data field of the intermediate object logical construct for the associated event logical construct as determined by the syntax of the given rule. If more than one event logical construct is associated with the given action, in other words a composite event, then further data fields may be instantiated and referenced from the intermediate object for each such event. The touch point and action logical constructs 314, 315 are then stored in the database 108 and the rule logical constructs field 303 for the relevant rule 301 is updated with the action identifier 317.

With reference to FIGS. 2 and 3D, in response to the input of a new CEP filter by a user via a filter name field 210 of the interface 201, a filter logical construct template 320 is created for representing the new filter. The filter logical construct template 320 comprises a first field 321 instantiated with a unique filter identifier (FID). The filter logical construct 320 comprises further sets of expression fields 322 provided for identifying each condition for the filter as specified via condition fields 211 of the interface 201. The filter logical construct 320 further comprises one or more expression operator fields 323 to represent the operators selected between each condition. Each such expression comprises a set of elements specified in the condition field 211 of the interface. Such elements are represented by a corresponding set of element fields 324 in the filter logical construct 320. The rule logical construct field 303 is updated with the new filter and the newly created filter logical object 323 is stored in the database 108 (FIG. 1).

With reference to FIGS. 1 and 4, the example rule input in the interface 201 in FIG. 2 will result in the creation of a set of eight logical constructs. For the new rule "Short Selling," a rule logical construct 401 is created, which references a "Sell" trigger event logical construct 402, a "Notify Customer Services (NCS)" action logical construct 403 and a "Short Selling" filter logical construct 404 that comprise the new CEP rule 110. The rule logical construct 401 also identifies the "Trade.CustomerID" relation between the events and actions that comprise the new CEP rule 110. A further event logical construct 405 has also been created to represent the "Sell" event specified as an element of the first expression of the "Short Selling" filter logical construct 404. Each of the "Buy" and "Sell" event logical constructs 402, 405 and the "NCS" action logical construct 403 has a corresponding touch point logical construct 406, 407. The "Buy" and "Sell" event logical constructs 402, 405 share a common touch point logical construct 406 instantiated with the value "Sales" while the touch point logical construct 407 for the "NCS" action logical construct 403 is instantiated with the value "CSS" for "Customer Services System." Creation of the "Sell" trigger event logical construct has resulted in the creation of a corresponding intermediate object logical construct 408. As a result of the added "CustomerID" relation identified in the rule logical construct 401, an appropriate field has been added to the intermediate object logical construct 408. Also, in response to the "Quantity" data value in the second expression of the filter logical construct 404, a further field has been added to the intermediate object logical construct 408.

Figure 5:
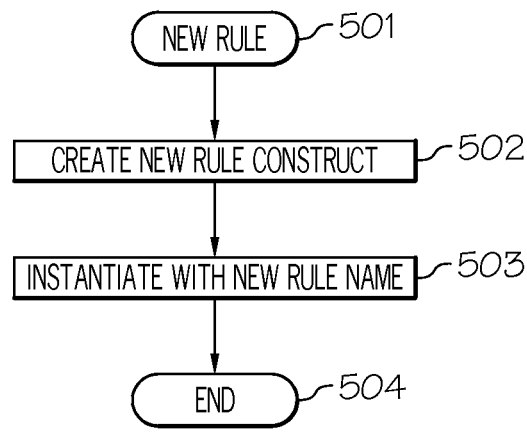
FIGS. 5-9 are flowcharts illustrating the processing performed by the CEP rule construction application program when creating the logical constructs of FIGS. 3A-3D in response to input via the interface of FIG. 2 in accordance with an embodiment of the present invention.

The processing performed by the CEP rule construction application program 112 (FIG. 1) in response to the entry of a new rule by a user via the interface 201 (FIG. 2) will now be described further with reference to the flowchart of FIG. 5. Referring to FIG. 5, in conjunction with FIGS. 1-2 and 3A-D, at step 501, processing is initiated in response to the completion of the entry of a new rule name via the interface 201 and processing moves to step 502. At step 502, a new rule logical construct template 301 is initialized and processing moves to step 503. At step 503, the template 301 is instantiated with the new rule name and the resulting new rule logical construct stored in the database 108. Processing then moves to step 504 and ends.

Figure 6:
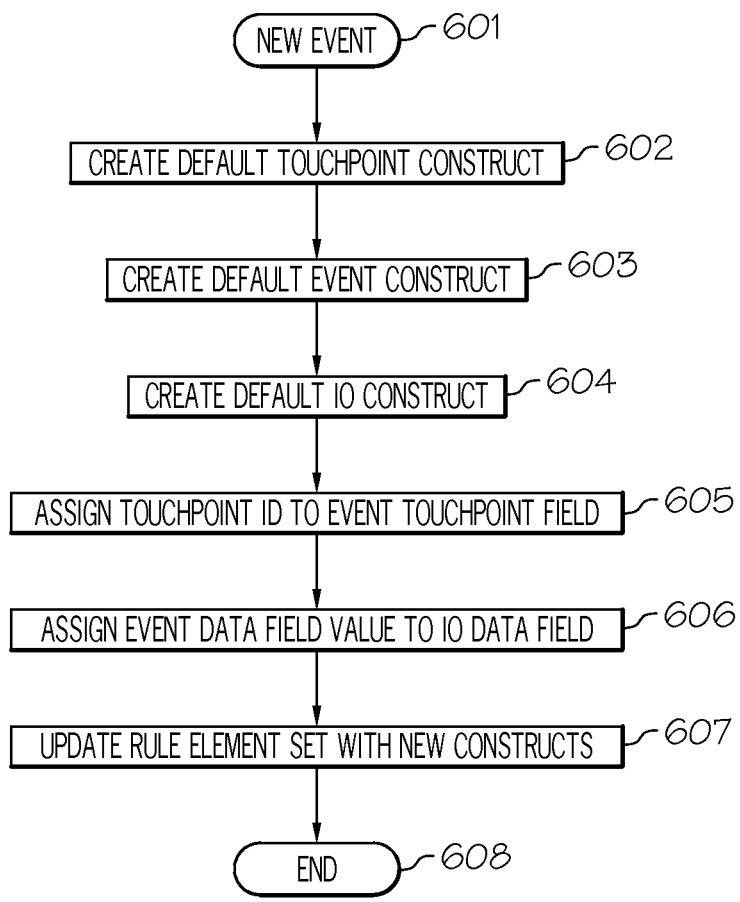

The processing performed by the CEP rule construction application program 112 in response to the entry of a new event by a user via the interface 201 will now be described further with reference to the flowchart of FIG. 6. Referring to FIG. 6, in conjunction with FIGS. 1-2 and 3A-D, at step 601, processing is initiated in response to the completion of the entry of a new event name via the interface 201 and processing moves to step 602. At step 602, a touch point logical construct template 304 is initialized and processing moves to step 603. At step 603, an event logical construct template 305 is initialized and processing moves to step 604. At step 604, where the event logical construct 305 is for the rule trigger event, an intermediate object logical construct template 306 is initialized and processing moves to step 605. At step 605, the touch point field 309 of the event logical construct 305 is updated with the touch point identifier 307 of the associated touch point logical construct 304 and processing moves to step 606. At step 606, the event data field value from the event logical construct 305 is assigned to an appropriate data field 312 of the corresponding intermediate object logical construct 306 and processing moves to step 607. At step 607, the rule logical construct field 303 for the relevant rule logical construct 301 is updated with the trigger event identifier 309 if applicable. Processing then moves to step 608 and ends.

Figure 7:
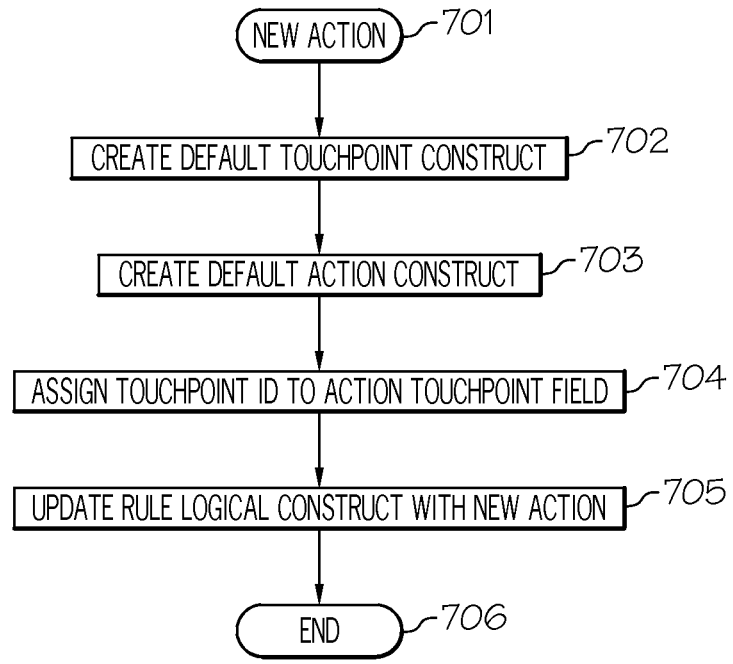

The processing performed by the CEP rule construction application program 112 in response to the entry of a new action by a user via the interface 201 will now be described further with reference to the flowchart of FIG. 7. Referring to FIG. 7, in conjunction with FIGS. 1-2 and 3A-3D, at step 701, processing is initiated in response to the completion of the entry of a new action name via the interface 201 and processing moves to step 702. At step 702, a touch point logical construct template 314 is initialized and processing moves to step 703. At step 703, an action logical construct template 315 is initialized and processing moves to step 704. At step 704, the touch point field 318 of the event logical construct 305 is updated with the touch point identifier 316 of the associated touch point logical construct 314 and processing moves to step 705. At step 705, the rule logical construct field 303 is updated with the action identifier 317. Processing then moves to step 706 and ends.

Figure 8:
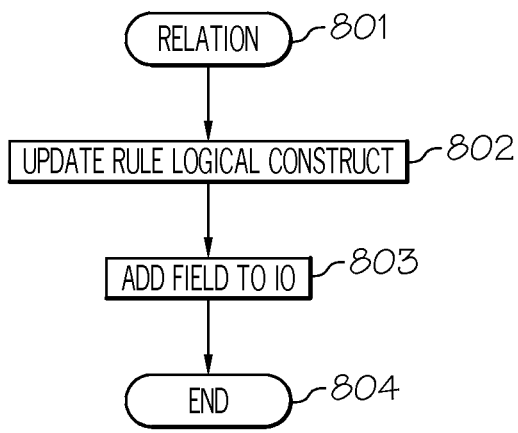

The processing performed by the CEP rule construction application program 112 in response to the entry of a relation by a user via the interface 201 will now be described further with reference to the flowchart of FIG. 8. Referring to FIG. 8, in conjunction with FIGS. 1-2 and 3A-D, at step 801, processing is initiated in response to the completion of the entry of a relation via the interface 201 and processing moves to step 802. At step 802, the rule logical construct field 303 is updated with the new relation and processing moves to step 803. At step 803, a new field 313 is added to the intermediate object logical construct 306. Processing then moves to step 804 and ends.

Figure 9:
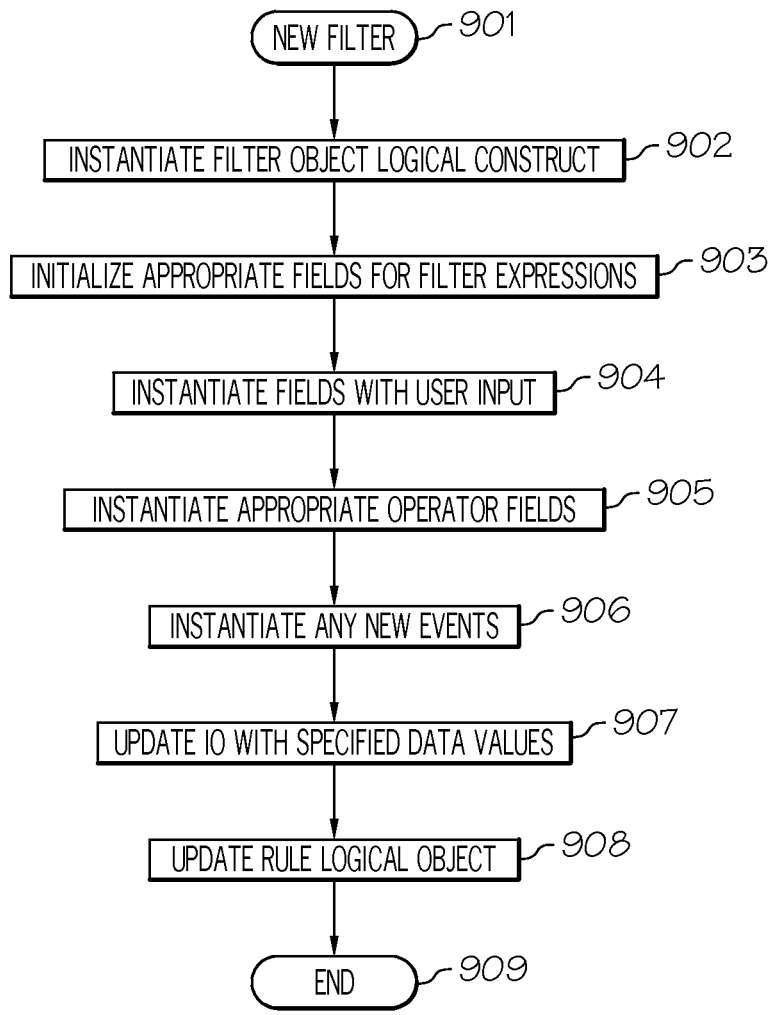

The processing performed by the CEP rule construction application program 112 in response to the entry of a new filter by a user via the interface 201 will now be described further with reference to the flowchart of FIG. 9. Referring to FIG. 9, in conjunction with FIGS. 1-2 and 3A-D, at step 901, processing is initiated in response to the completion of the entry of a new filter via the interface 201 and processing moves to step 902. At step 902, a filter logical construct 320 is created from the template and processing moves to step 903. At step 903, a set of fields 324 for each relevant expression 322 of the filter are initialized and processing moves to step 904. At step 904 each of the element fields 324 are instantiated as defined in the user input and processing moves to step 905. At step 905, an operator field 323 is updated to identify the user specified operator between the filter expressions or clauses and processing moves to step 906. At step 906, where a new event has been specified as a filter element, the new event processing described above with reference to FIG. 5 is triggered and processing moves to step 907. At step 907, the intermediate object logical construct 306 is updated with any data values specified as required by the filter and processing moves to step 908. At step 908, the rule logical construct field 303 is updated with the identifier 321 of the filter logical construct. Processing then moves to step 909 and ends.

As will be understood by those skilled in the art, in response to the definition of a touch point by a user via the interface 201, the CEP rule construction application program 112 is arranged to update the relevant touch point logical construct 304, 314 with the inputted label.

In another embodiment, the type of data field in new filter logical construct is assigned a predetermined default type so as to provide weak typing for those fields. In the present embodiment, the default type is string. If, however, the data in a given field is greater than a predetermined number, such as 1000, the type reverts to integer.

Embodiments of the invention are arranged to enable CEP rules to be constructed with their components, such as events, actions, relations, touch points, filters and filter clauses, being defined in-place in a weakly typed manner. In other words, the rule components can be created as place-holders or templates and form part of a given rule prior to being amended to fit into a current CEP system or having further detail added such as data connections or additional logical constructs. This enables the CEP rule design or definition process to be made more efficient as it reduces iterations between users having distinct skill sets. Furthermore, the main user, such as the business analyst is able to drive the development process and experiment with different approaches before handing on the partially defined solution to the IT specialist.

For example, where the CEP system is a business event processing (BEP) system, the rules will generally be specified from a business point of view by a business analyst. The business analyst will have detailed knowledge of the relevant business processes and conditions, in other words, the business analyst has advanced domain knowledge. However, the technical specification of how a given rule connects to and interacts with the existing BEP structure requires detailed technical knowledge of the CEP/BEP system and is thus performed by an information technology (IT) engineer or CEP/BEP programmer. Such specification is commonly performed using a specific software tool provided for the task. Enabling the higher level analyst to initiate the rule design process and provide greater detail in such an initial stage provides greater detail of the rules logic for the IT engineer to work with, effectively improving information detail and flow between the two skill sets and thus reducing the possible iterations between them. Furthermore, the automatic generation of rule elements further increases the detail produced by the business and reduces the workload for the IT engineer. The increased detail in the rules at a relatively early stage in their construction enables more effective testing to be performed at an earlier stage, for example, by the higher level user such as the business analyst, using a suitable test harness to run the rules against test data. Again, such early testing helps to reduce iterations between the two skill sets.

The CEP rule generation process described above creates new CEP rules, which although they may be incomplete, can be tested against suitable test data. Where only general test data is used, the logical correctness of a given rule can be tested by a high level user and modified if necessary, further reducing need for reversion to a more technical user.

As noted above, the event or action logical constructs may comprise one or more default event or action data input or output fields such as the default Value data field 319 in FIG. 3C. Where such default fields, that provide the event logical construct data inputs and action logical construct data outputs, are not instantiated automatically in the CEP rule construction described above, they may be subsequently manually instantiated. In other words, where a constructed CEP rule is incomplete, it may be connected to the CEP system in which it is designed to operate by the correct instantiation of fields of its constituent logical constructs.

As will be understood by those skilled in the art, the particular constructs or elements that comprise a rule are dependent on the CEP system for which embodiments of the present invention are provided. The syntax of the rules may vary from the examples described above and the types or number of types of elements or their function or structure may be varied. For example, instead of one or more intermediate object (IO) logical constructs being generated in response to the specification of a new event, one or more of the IO logical constructs may be created in response to the specification of one or more of the corresponding actions.

An example of a CEP system in the form of a BEP system is the IBM® Websphere® Business Events software system provided by the IBM Corporation. (IBM and WebSphere are trademarks of International Business Machines Corporation in the United States, other countries, or both.)

Figure 10:
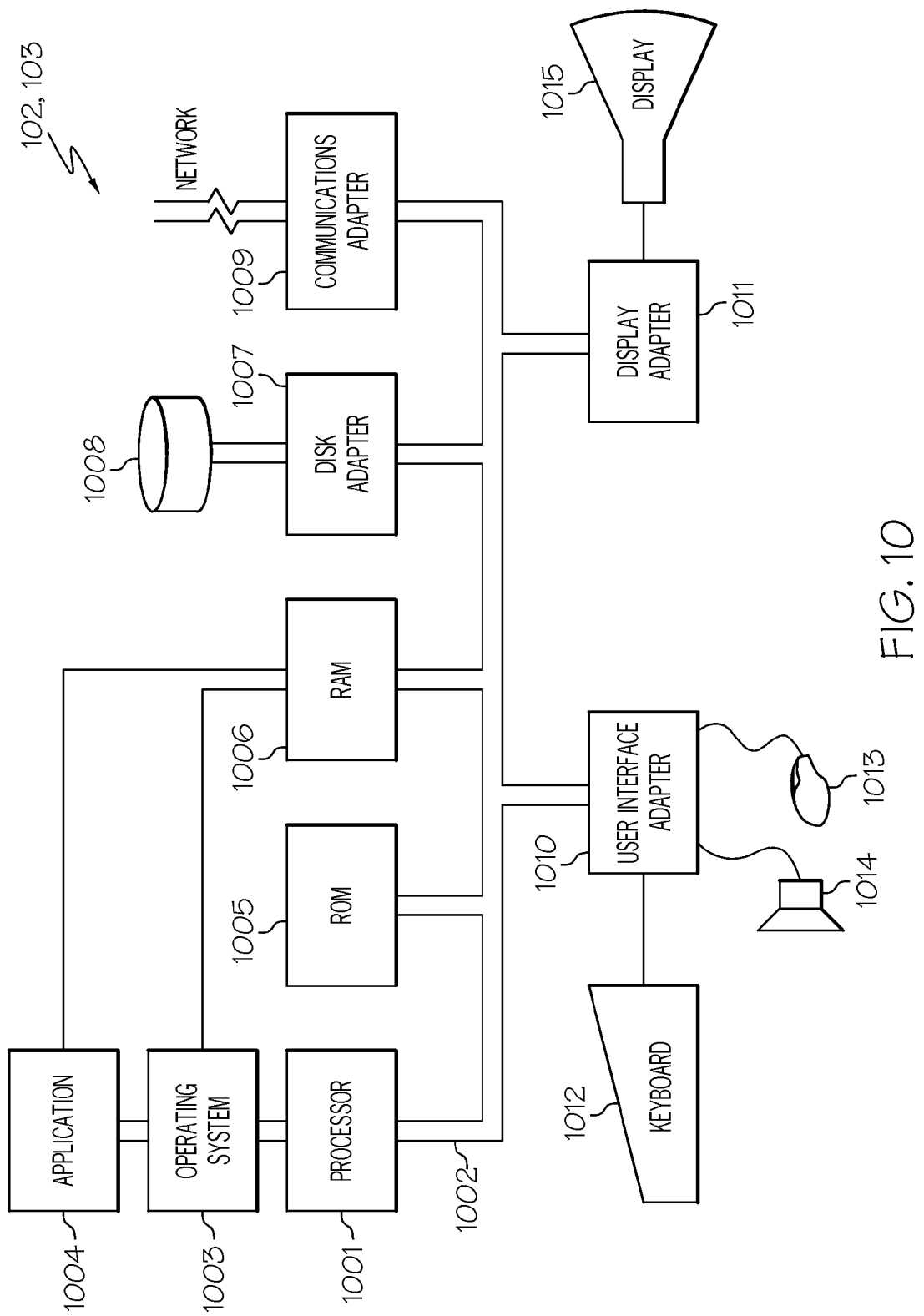
FIG. 10 illustrates a hardware environment for a computer system for practicing the principles of the present invention in accordance with an embodiment of the present invention.

FIG. 10 depicts an embodiment of a hardware configuration of a computer system 102, 103 which is representative of a hardware environment for practicing the present invention. Referring to FIG. 10, computer system 102, 103 has a processor 1001 coupled to various other components by system bus 1002. An operating system 1003 may run on processor 1001 and provide control and coordinate the functions of the various components of FIG. 10. An application 1004 (e.g., application 107, application 112) in accordance with the principles of the present invention may run in conjunction with operating system 1003 and provide calls to operating system 1003 where the calls implement the various functions or services to be performed by application 1004.

Referring again to FIG. 10, read-only memory ("ROM") 1005 may be coupled to system bus 1002 and include a basic input/output system ("BIOS") that controls certain basic functions of computer device 102, 103. Random access memory ("RAM") 1006 and disk adapter 1007 may also be coupled to system bus 1002. It should be noted that software components including operating system 1003 and application 1004 may be loaded into RAM 1006, which may be computer system's 102, 103 main memory for execution. Disk adapter 1007 may be an integrated drive electronics ("IDE") adapter that communicates with a disk unit 1008, e.g., disk drive.

Computer system 102, 103 may further include a communications adapter 1009 coupled to bus 1002. Communications adapter 1009 may interconnect bus 1002 with an outside network (not shown) thereby allowing computer system 102, 103 to communicate with other similar devices.

I/O devices may also be connected to computer system 102, 103 via a user interface adapter 1010 and a display adapter 1011. Keyboard 1012, mouse 1013 and speaker 1014 may all be interconnected to bus 1002 through user interface adapter 1010. Data may be inputted to computer system 102, 103 through any of these devices. A display monitor 1015 may be connected to system bus 1002 by display adapter 1011. In this manner, a user is capable of inputting to computer system 102, 103 through keyboard 1012 or mouse 1013 and receiving output from computer system 102, 103 via display 1015 or speaker 1014.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details described in connection with several embodiments of a method, system and computer program product, and illustrative examples shown and described. Accordingly, departures may be made from such details without departure from the applicant's general inventive concept.

The invention claimed is:

1. A computer program product embodied in a computer readable storage medium for construction of rules for use in a complex event processing application program, the computer program product comprising the programming instructions for:
   providing a rule construction interface for constructing rules for a rule set of a complex event processing system, said rules comprising definitions of one or more detected events and corresponding actions, said interface being arranged to enable a user definition of new events or actions during a rule construction process;
   in response to an identification of a new event or action during said rule construction process via said rule construction interface, generating a corresponding event or action logical construct for representing said event or action in said complex event processing system;
   generating an intermediate logical construct arranged to provide a data connection for said event or action logical construct; and
   linking said event or action logical construct to a corresponding action or event logical construct via said intermediate logical construct.

2. The computer program product as recited in claim 1, wherein said intermediate logical construct is created in response to said event logical construct.

3. The computer program product as recited in claim 2, wherein said event logical construct represents a trigger event for a rule.

4. The computer program product as recited in claim 1, wherein said event or action logical construct comprises one or more of the following: default event input field, default event output field, action data input field and action data output field for subsequent manual instantiation of event logical construct data inputs and action logical construct data outputs.

5. The computer program product as recited in claim 4, wherein said default event or action data input or output fields are arranged for use with test data for testing a rule.

6. The computer program product as recited in claim 1 further comprising the programming instructions for:
   in response to a definition of a new touch point for a given action or event for specifying a source of input data for said corresponding event logical construct or a target of output data for said corresponding action logical construct, generating a corresponding touch point logical construct associated with said event or action logical construct and identifying said source or said target.

7. The computer program product as recited in claim 1 further comprising the programming instructions for:
   in response to a specification of a new relation between said detected events and corresponding actions for a rule, updating said intermediate logical construct with data representing said new relation.

8. The computer program product as recited in claim 1 further comprising the programming instructions for:
   in response to a specification of a new filter for a rule, updating said intermediate logical construct with data representing data of said new filter.

9. A system, comprising:
   a memory unit for storing a computer program for construction of rules for use in a complex event processing application program; and
   a processor coupled to said memory unit, wherein said processor, responsive to said computer program, comprises:
   circuitry for providing a rule construction interface for constructing rules for a rule set of a complex event processing system, said rules comprising definitions of one or more detected events and corresponding actions, said interface being arranged to enable a user definition of new events or actions during a rule construction process;
   in response to an identification of a new event or action during said rule construction process via said rule construction interface, circuitry for generating a corresponding event or action logical construct for representing said event or action in said complex event processing system;
   circuitry for generating an intermediate logical construct arranged to provide a data connection for said event or action logical construct; and
   circuitry for linking said event or action logical construct to a corresponding action or event logical construct via said intermediate logical construct.

10. The system as recited in claim 9, wherein said intermediate logical construct is created in response to said event logical construct.

11. The system as recited in claim 10, wherein said event logical construct represents a trigger event for a rule.

12. The system as recited in claim 9, wherein said event or action logical construct comprises one or more of the following: default event input field, default event output field, action data input field and action data output field for subsequent manual instantiation of event logical construct data inputs and action logical construct data outputs.

13. The system as recited in claim 12, wherein said default event or action data input or output fields are arranged for use with test data for testing a rule.

14. The system as recited in claim 9, wherein said processor further comprises:
   in response to a definition of a new touch point for a given action or event for specifying a source of input data for said corresponding event logical construct or a target of output data for said corresponding action logical construct, circuitry for generating a corresponding touch point logical construct associated with said event or action logical construct and identifying said source or said target.

15. The system as recited in claim 9, wherein said processor further comprises:
   in response to a specification of a new relation between said detected events and corresponding actions for a rule, circuitry for updating said intermediate logical construct with data representing said new relation.

16. The system as recited in claim 9, wherein said processor further comprises:
   in response to a specification of a new filter for a rule, circuitry for updating said intermediate logical construct with data representing data of said new filter.

* * * * *